(12) United States Patent
Page et al.

(10) Patent No.: US 10,681,215 B1
(45) Date of Patent: Jun. 9, 2020

(54) MULTI-DIMENSIONAL ATTRIBUTE-BASED ROUTING

(71) Applicant: INCONTACT INC., Sandy, UT (US)

(72) Inventors: Matthew Lawrence Page, Sandy, UT (US); Nicholas Ian Terry, Magna, UT (US); Christopher Garn Seaman, South Jordan, UT (US)

(73) Assignee: INCONTACT INC., Sandy, UT (US)

( * ) Notice: Subject to any disclaimer, the term of this patent is extended or adjusted under 35 U.S.C. 154(b) by 0 days.

(21) Appl. No.: 16/682,536

(22) Filed: Nov. 13, 2019

(51) Int. Cl.
*H04M 3/523* (2006.01)

(52) U.S. Cl.
CPC .... *H04M 3/5232* (2013.01); *H04M 2203/558* (2013.01)

(58) Field of Classification Search
CPC .................. H04M 3/5232; H04M 2203/558
USPC .................. 379/265.11, 265.01, 266.01, 309
See application file for complete search history.

(56) References Cited

U.S. PATENT DOCUMENTS

| 7,349,535 | B2 | 3/2008 | Shaffer et al. |
| 9,723,075 | B2 | 8/2017 | Pino et al. |
| 2010/0049852 | A1* | 2/2010 | Whitnah ............... H04L 47/783 709/226 |
| 2019/0385219 | A1* | 12/2019 | Ouyang ................. G06N 5/048 |

* cited by examiner

*Primary Examiner* — Quynh H Nguyen
(74) *Attorney, Agent, or Firm* — Haynes and Boone, LLP

(57) ABSTRACT

Methods for routing customers to an agent include receiving a communication from a customer; assigning or retrieving a plurality of mandatory and optional customer attributes; matching the plurality of mandatory and optional customer attributes to a plurality of attributes of available agents; calculating a first affinity score for each available agent that possesses the mandatory customer attributes; determining for each available agent a number of attributes matching the optional customer attributes; ranking the available agents based on the number of matched optional customer attributes; selecting a predetermined number of available agents from the ranked available agents; calculating a second affinity score for each of the selected predetermined number of available agents; combining the first affinity and second affinity score; determining which available agent has the highest combined first affinity and second affinity score; and routing the communication to the available agent having the highest combined score.

17 Claims, 4 Drawing Sheets

MULTI-DIMENSIONAL ATTRIBUTE-BASED ROUTING

TECHNICAL FIELD

The present disclosure relates generally to efficiently routing customers to available agents associated with a contact center, and more specifically to a system and method for matching a customer to an ideal agent based on a certain number of attributes.

BACKGROUND

In a contact center environment, much or little may be known about a consumer (also referred to as a customer or contact in other contact center literature) with whom the contact center may come in contact. Some businesses with contact centers deem it a competitive advantage to match personality characteristics between a consumer and a contact center agent. This anticipated compatibility is thought to increase the likelihood of increased sales, faster problem resolution, or higher customer loyalty.

The choice of characteristic or attribute upon which this compatibility is based may vary widely between businesses, countries or cultures. For many companies, it is the native language spoken. Other companies may prefer a gender match. Yet other companies may prefer something else. Given a choice, many companies might assign multiple attributes to compute this compatibility, with fine control over weights or other combinations.

Contact center solutions provided by various vendors may provide some measure of compatibility between the consumer and the available pool of contact center agents, but the data available for the computations within the contact center servers may not include data from databases held by the business (especially true in the case of cloud-hosted call centers), or that data may have to be provided statically in periodic data batches. Additionally, the control or methodology of the compatibility computation may not be configurable, dynamically or otherwise, by the business. As to the attributes themselves, currently there are often undesirable tradeoffs between binary attributes versus numerical attributes.

Accordingly, a need exists for improved methods and systems for determining the compatibility between customers and agents, and routing such customers to such agents.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
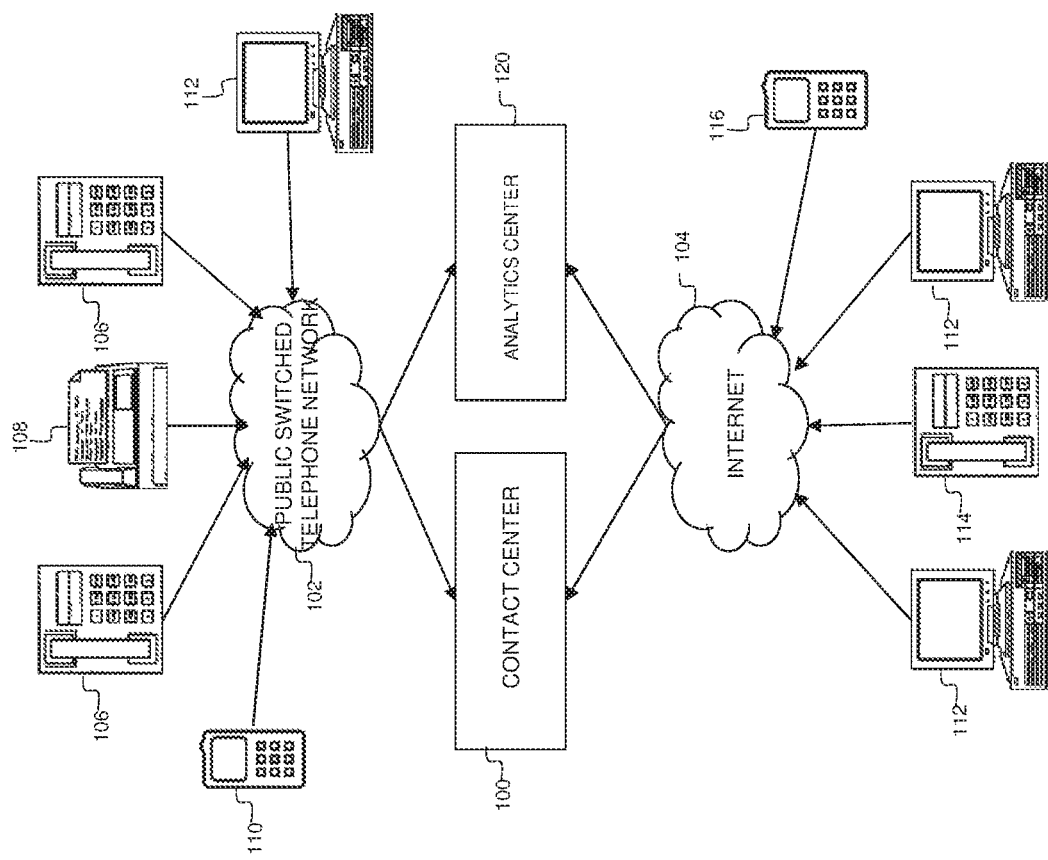
FIG. 1 is a simplified block diagram of an embodiment of a contact center according to various aspects of the present disclosure.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The systems and methods described herein solve earlier problems of data limitations, limitations on the number, or type of attributes used for compatibility analysis, and provide dynamic control over the computing of consumer-agent affinity. The present disclosure improves the ability of an automatic communication distributor (ACD) to match a customer to his or her ideal agent based on an arbitrary number of factors, and normalizes multiple factors of desirability into a single vector in order to make ACD routing decisions.

ACDs are specialized systems that are configured to match customer communications to an available contact center agent. ACDs generally receive incoming communications, determine where to route a particular customer communication, and connect the customer communication to an available agent. For the purposes of the present disclosure, "ACD" refers to any combination of hardware, software and/or embedded logic that is operable to automatically distribute incoming communications, including requests for service transmitted using any audio and/or video means, including signals, data or messages transmitted through voice devices, text chat, web sessions, facsimile, instant messaging and e-mail.

The present disclosure describes a matching function that is used to measure the compatibility or affinity between a customer and available agents (i.e., agents who are available to handle a contact or customer). Once the customer is in contact with the contact center, the matching function (further described below) is used to identify an available contact center agent. Once the "best" available contact center agent is identified, the customer is routed to the best available agent, and normal customer processing proceeds between the customer and the agent until the communication terminates or the customer is transferred to another party.

To enable the matching function, the customer is typically first identified. Next, the set of mandatory attributes assigned to the customer is intersected or matched with the sets of attributes assigned to each available agent. Only those agents that possess sets that have all the mandatory attributes are selected. Similarly, the set of optional attributes assigned to the customer is intersected or matched with the sets of attributes assigned to each available agent. The optional attribute results are generally sorted by the number of matching optional attributes in descending order, and the top n matches are selected, where n is a configurable number.

From the matched mandatory attributes, affinity scores are added, then generally sorted in descending order and assigned to a set called "mandatory sorted." The same operation is similarly performed on the matched optional attributes, and the resulting set can be called "optional sorted." For the optional attributes, the sum is typically multiplied by the number of matching optional attributes.

The "mandatory sorted" set is then joined with the "optional sorted" set by the agent identifier. This resulting set is sorted in descending order by the summed score. The first agent is subsequently selected, and the resulting agent identifier is returned. Finally, the customer is routed to the agent associated with the returned agent identifier in this embodiment.

Advantageously, customer communications and agents are able to be matched based on an arbitrary number of factors, both binary and non-binary (i.e., value-based), which enables absolute and graded grouping, which can be adjusted in real-time based on agent performance, time of day, and other similar metrics. This also allows for matching more compatible agents to customers, thus improving the customer experience by reducing barriers such as culture, language and relevant experience.

No current contact center ACD engines are believed to be able to connect customers to agents based on more than a single skill or dimension. Current engines are further limited by the complicated naming and grouping of skills to achieve "quasi-dimensional" routing through ever-increasing and complicated "trees" of skills based on ever-increasing prefixes and postfixes to the skills' names. This disclosure describes a more efficient system, apparatus, media, and methods of efficiently considering a plurality of skills or dimensions to match and route customers and agents.

FIG. 1 is a simplified block diagram of an embodiment of a contact center 100 according to various aspects of the present disclosure. The term "contact center," as used herein, can include any facility or system server suitable for receiving and recording electronic communications from customers. Such customer communications can include, for example, telephone calls, facsimile transmissions, e-mails, web interactions, voice over IP ("VoIP") and video. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to receive and record varying electronic communications and data formats that represent an interaction that may occur between a customer (or caller) and a contact center agent during fulfillment of a customer and agent transaction. In one embodiment, the contact center 100 records all of the customer calls in uncompressed audio formats. In the illustrated embodiment, customers may communicate with agents associated with the contact center 100 via multiple different communication networks such as a public switched telephone network (PSTN) 102 or the Internet 104. For example, a customer may initiate an interaction session through traditional telephones 106, a fax machine 108, a cellular (i.e., mobile) telephone 110, a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs).

Often, in contact center environments such as contact center 100, it is desirable to facilitate routing of customer communications, particularly based on agent availability, prediction of profile (e.g., personality type) of the customer occurring in association with a customer interaction, and/or matching of customer attributes to agent attributes, be it a telephone-based interaction, a web-based interaction, or other type of electronic interaction over the PSTN 102 or Internet 104.

As one of ordinary skill in the art would recognize, the illustrated example of communication channels associated with a contact center 100 in FIG. 1 is just an example, and the contact center may accept customer interactions, and other analyzed interaction information and/or routing recommendations from an analytics center, through various additional and/or different devices and communication channels whether or not expressly described herein.

For example, in some embodiments, internet-based interactions and/or telephone-based interactions may be routed through an analytics center 120 before reaching the contact center 100 or may be routed simultaneously to the contact center and the analytics center (or even directly and only to the contact center). Also, in some embodiments, internet-based interactions may be received and handled by a marketing department associated with either the contact center 100 or analytics center 120. The analytics center 120 may be controlled by the same entity or a different entity than the contact center 100. Further, the analytics center 120 may be a part of, or independent of, the contact center 100.

Figure 2:
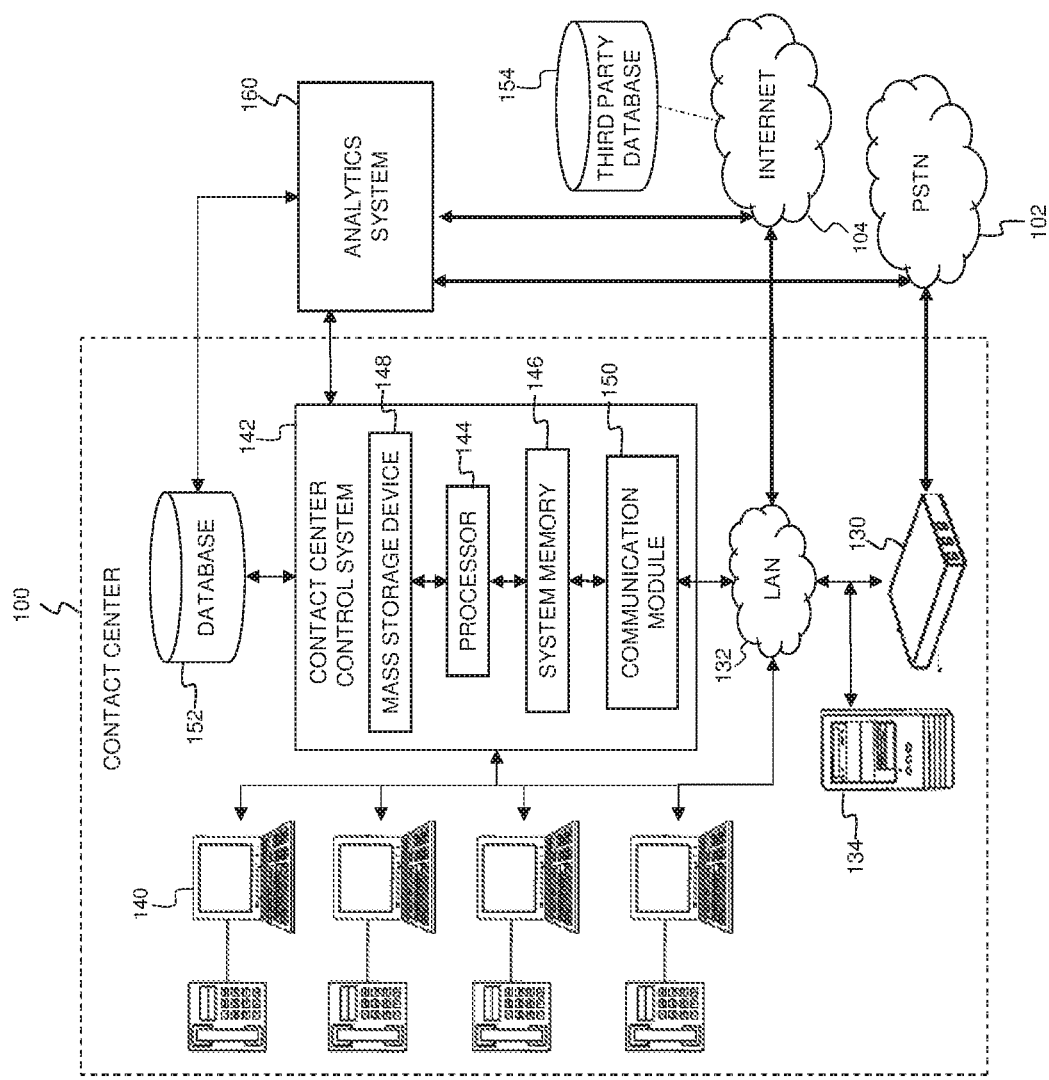
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130 and/or ACD 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

ACD 130 distributes customer communications or tasks to agents. Generally, ACD 130 is part of a switching system designed to receive customer communications and queue them. In addition, ACD 130 as shown distributes communications to agents or specific groups of agents typically according to a prearranged scheme. In one embodiment, ACD 130 is integrated with PBX switch 130, and directs customer communications to one of a plurality of agent workstations 140.

According to an exemplary embodiment, ACD 130 includes a processor, a network interface, and a memory module or database. The network interface joins ACD 130 with LAN 132. Once ACD 130 receives a customer communication, the processor determines which of a plurality of agents should receive the communication. For example, the processor may access the memory module, which stores code executed by the processor to perform various tasks.

In various embodiments, the processor includes a plurality of engines or modules. Examples of suitable engines include a distributor engine, a queue engine, and a monitor engine. The distributor engine distributes incoming customer communications to available agents, the queue engine monitors and maintains customer communications that are waiting to be connected to agents, and the monitor engine checks the status and skills of agents and stores appropriate information in the memory module.

The memory module stores various information about agents at the contact center, including, but not limited to, agent skills or attributes, agent location, and agent availability. Various alternative embodiments of ACD 130 may store different or additional information useful for communication routing as well. Over time, monitor engine updates agent skills information, location information, and availability based on changes in agent status detected.

Generally, ACD 130 receives incoming communications that may be handled by one of the agents at the contact center. The distributor engine connects the communication to an appropriate available agent if the agent is available. If the agent is not available, the communication is generally held by the queue engine until the agent becomes available. While a customer is waiting for an agent, ACD 130 may collect data from the customer or perform other automated processes. Once the agent is available, the distributor engine routes the communication to the agent.

In an exemplary embodiment, ACD 130 is configured to perform attribute-based routing, which refers to routing incoming communications based on matching the attributes of the customer and the attributes of the agents. This ensures that communications go to agents with the correct attributes to ensure a better customer experience. Attribute-based routing considers the unique skills of individual agents and the preferences of individual customers to route customer communications to the most qualified or most appropriate agent.

When a customer communication is received at ACD 130, the customer may first be identified (e.g., via the customer's touch-tone entry of an account number or identification number, caller ID, or identification number associated with the customer), and a customer profile may be retrieved from a database (e.g., database 152). Before connecting the communication, the database is typically queried to determine customer preferences. Agent information stored in memory module is also queried to determine which attributes of the agents match the preferences of the customer. Once a suitable agent is identified, distributor engine routes the communication to the appropriate agent workstation 140.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such Ti, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

As shown in FIG. 2, the contact center 100 includes a plurality of agent workstations 140 that enable agents employed by the contact center 100 to engage in customer interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the customer, respond to email inquiries, receive faxes, engage in instant message conversations, text (e.g., SMS, MMS), respond to website-based inquires, video chat with a customer, and otherwise participate in various customer interaction sessions across one or more channels including social media postings (e.g., Facebook, LinkedIn, etc.). Further, in some embodiments, the agent workstations 140 may be remotely located from the contact center 100, for example, in another city, state, or country. Alternatively, in some embodiments, an agent may be a software-based application configured to interact in some manner with a customer. An exemplary software-based application as an agent is an online chat program designed to interpret customer inquiries and respond with pre-programmed answers.

The contact center 100 further includes a contact center control system 142 that is generally configured to provide recording, voice analysis, behavioral analysis, text analysis, storage, and other processing functionality to the contact center 100. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data, such as known voice prints, may be stored on the mass storage device 148. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze customer voice data and other structured and unstructured data, and other tools may be used in association therewith to increase efficiency and efficacy of the contact center. As an aspect of this, the control system 142 is operable to record unstructured interactions between customers and agents occurring over different communication channels including without limitation telephone conversations, email exchanges, website postings, social media communications, smartphone application (i.e., app) communications, fax messages, texts (e.g., SMS, MMS, etc.), and instant message conversations. For example, the control system 142 may include a hardware or software-based recording server to capture the audio of a standard or VoIP telephone connection established between an agent workstation 140 and an outside customer telephone system. Further, the audio from an unstructured telephone call or video conference session (or any other communication channel involving audio or video, e.g., a Skype call) may be transcribed manually or automatically and stored in association with the original audio or video. In one embodiment, multiple communication channels (i.e., multi-channel) may be used, either in real-time to collect information, for evaluation, or both. For example, control system 142 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 142 is configured to captured structured data related to customers, agents, and their interactions. For example, in one embodiment, a "cradle-to-grave" recording may be used to record all information related to a particular telephone call from the time the call enters the contact center to the later of: the caller hanging up or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific customers may be collected and associated with each customer, including without limitation the number and length of calls placed to the contact center, call origination information, reasons for interactions, outcome of interactions, average hold time, agent actions during interactions with customer, manager escalations during calls, types of social media interactions, number of distress events during interactions, survey results, and other interaction information. In addition to collecting interaction data associated with a customer, the control system 142 is also operable to collect biographical profile information specific to a customer including without limitation customer phone number, account/policy numbers, address, employment status, income, gender, race, age, education, nationality, ethnicity, marital status, credit score, customer "value" data (i.e., customer tenure, money spent as customer, etc.), personality type (as determined by past interactions), and other relevant customer identification and biological information.

The control system 142 may also collect agent-specific unstructured and structured data including without limitation agent personality type, gender, language skills, technical skills, performance data (e.g., customer retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different interaction data, customer data, agent data, and telephony data may be collected and processed by the control system 142.

The control system 142 may store recorded and collected interaction data in a database 152, including customer data and agent data. In certain embodiments, agent data, such as agent scores for dealing with customers, are updated daily.

The control system 142 may store recorded and collected interaction data in a database 152. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third party database 154. In certain embodiments, the control system 142 may query the third party database for customer data such as credit reports, past transaction data, and other structured and unstructured data.

Additionally, in some embodiments, an analytics system 160 may also perform some or all of the functionality ascribed to the contact center control system 142 above. For instance, the analytics system 160 may record telephone and internet-based interactions, and/or perform behavioral analyses. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store analytics software and other software instructions.

Figure 3:
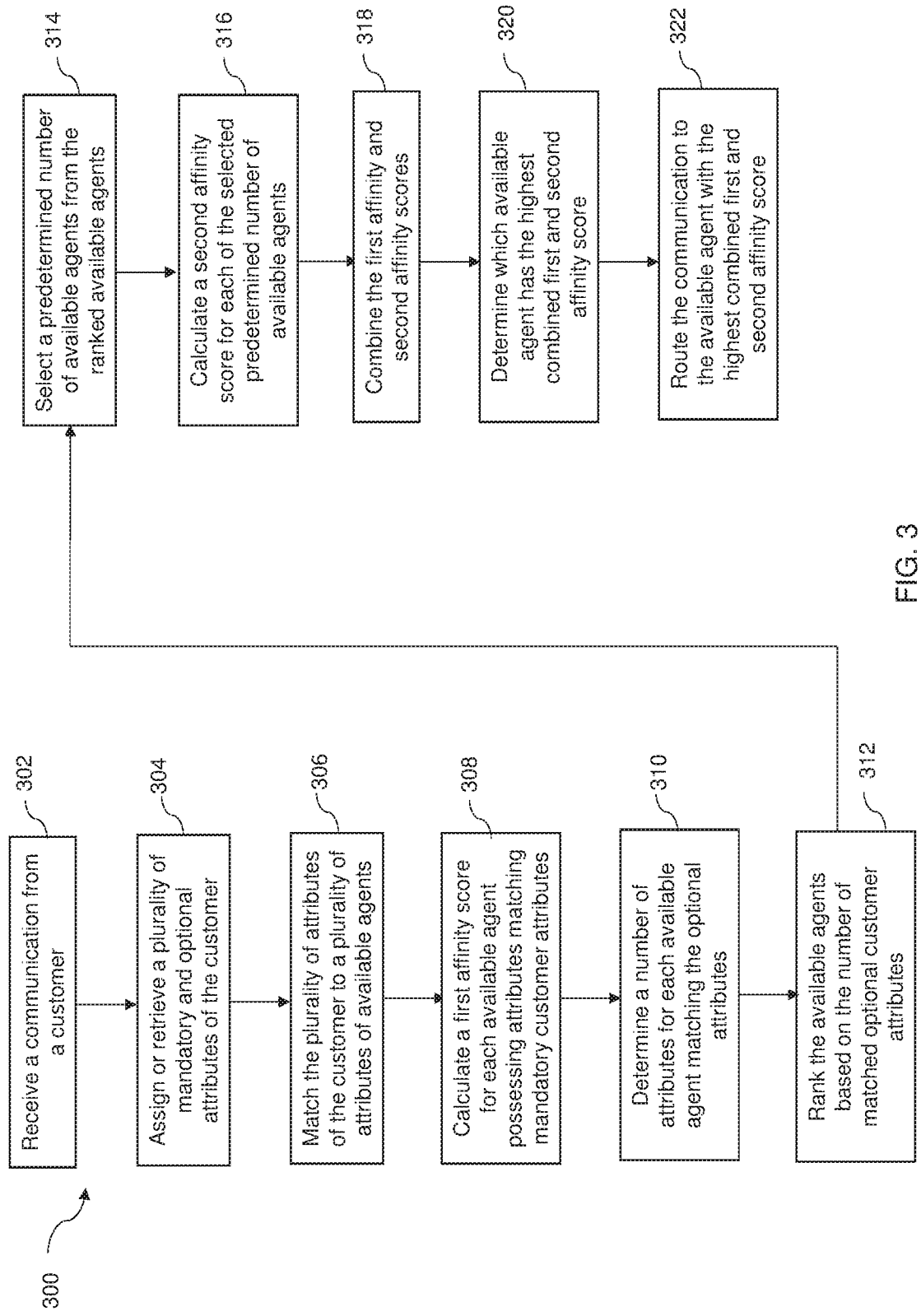
FIG. 3 is a flowchart of a method according to embodiments of the present disclosure.

Referring now to FIG. 3, a method 300 for routing customer communications is described. At step 302, ACD 130 receives a contact or communication from a customer. The communication type may include any of the channels discussed herein or available to those of ordinary skill in the art, including without limitation one or more voice calls, voice over IP, facsimiles, emails, web page submissions, internet chat sessions, wireless messages (e.g., text messages such as SMS (short messaging system) messages or paper messages), short message service (SMS), multimedia message service (MMS), or social media (e.g., Facebook identifier, Twitter identifier, etc.), IVR telephone sessions, voicemail messages (including emailed voice attachments), or any combination thereof. In one embodiment, the communication is a telephonic interaction.

At step 304, ACD 130 assigns or retrieves a plurality of mandatory and optional attributes of the customer. In various embodiments, the customer is first identified by a unique identifier, and the identifier is used to retrieve the attributes of the customer. This identifier may be assigned at times such as when contact is attempted or when the customer information is recorded in the system.

If the customer can be identified in the contact center system, attributes of the customer already known by the system may be used, or may be supplemented or replaced by one or more attributes identified during subsequent customer interactions. The contact center system may also include, or interface to, other systems commonly used for consumer sales or care, such as a Customer Relationship Management (CRM) system.

In certain embodiments, the customer attributes are retrieved by ACD 130 from a plurality of sources. For example, the attributes can be sourced from a number of places, such as individual tenants, various analytics services (e.g., Mattersight Corporation), and business intelligence. In some embodiments, various attributes are loaded from various sources, and are categorized as either an optional or mandatory attribute.

The customer attributes may include gender, language, technical proficiency required, location, and/or location derivatives, such as time zone. Attributes may be binary or non-binary. Binary attributes may be treated as having a binary value, the minimum or maximum possible score, or a higher or lower value. Some examples of binary attributes include gender or whether someone is a smoker or not. Non-binary attributes may be provided a specific value or score. Some examples of non-binary attributes include age, race, location, language, technical proficiency, and years of experience.

In some embodiments, ACD 130 incorporates algorithms to automatically redistribute non-binary attributes to sub-attributes to avoid customer congestion based on a large, shared attribute among many agents, thereby improving service level agreement (SLA) times and the like. SLA response times usually refer to how quickly the contact center responds to a technical issue being raised via phone, email or other methods. For example, a large attribute such as age can be divided into sub-attributes such as 18-34 years old, 35-54 years old, and 55-75 years old. Breaking up the attribute allows the match work to be more distributed.

In various embodiments, customer attributes may be dynamically derived or inferred during the communication, and these attributes may be stored and managed in a database (e.g., database 152). Derived or inferred attributes may be based on: (1) location, if known via mechanisms such as Calling Party Information or inferred by mechanisms such as IP address mapping; (2) the derived time zone, if location can be determined or inferred; (3) gender, via mechanisms such as voice or text analysis; (4) mood, via mechanisms such as voice or text analysis; (5) subject or intention, via mechanisms such as speech analytics, which may determine the purpose or subject of the customer communication via mechanisms such as initial voice recordings made by the system; (6) type of contact (voice, chat, email, SMS, etc.); (7) the address, URL, phone number or other target used when the customer initiates contact with the contact center; and/or (8) options selected by the customer during the communication, such as IVR options.

At step 306, ACD 130 matches the plurality of customer attributes to a plurality of attributes of available agents. In the contact center system, a unique identifier is typically assigned to each agent, such as when the agent record is created in the system or when the agent is logged into the system. This agent identifier can be used to retrieve attributes of the agent from a database (e.g., memory module of ACD 130). Like customers, agents are also assigned attributes such as gender, languages, technical proficiencies, location, location derivatives such as time zone, and/or any other agent-related information.

The set of mandatory attributes assigned to the customer is compared with the sets of attributes assigned to each available agent to determine the available agents that have all the mandatory customer attributes. The set of optional attributes of the customer is similarly compared with the sets of attributes assigned to each available agent.

At step 308, ACD 130 calculates a first affinity score for each available agent that possesses attributes matching the mandatory customer attributes. For example, a score is assigned to each agent attribute that matches a mandatory customer attribute, and the sum of the scores is then calculated. In some embodiments, the agents are ranked in descending order by the number of matched attributes.

At step 310, ACD 130 determines a number of attributes for each available agent matching the optional customer attributes. For example, ACD 130 may determine that an available agent possesses two (2) of the customer's optional attributes.

At step 312, ACD 130 ranks the available agents based on the number of matched optional customer attributes. In several embodiments, the available agents are ranked in descending order by the number of optional customer attributes matched.

At step 314, ACD 130 selects a predetermined number of available agents from the ranked available agents. For example, the top n matches are selected, where n is a configurable number. In one embodiment, the top 3 or 4 matches are selected.

At step 316, ACD 130 calculates a second affinity score for each of the selected predetermined number of available agents. In some embodiments, calculating the second affinity score includes assigning a score for each agent attribute that matches an optional customer attribute, and then calculating the sum of the scores. The sum of the scores for the matched optional attributes is then multiplied by the number of matched optional attributes to provide the second affinity score.

At step 318, ACD 130 combines the first affinity score and the second affinity score for each available agent that possesses the plurality of mandatory customer attributes and is part of the selected predetermined number of available agents.

At step 320, ACD 130 determines which available agent has the highest combined first affinity score and second affinity score.

At step 322, ACD 130 routes the communication to the available agent having the highest combined first affinity and second affinity score.

In certain embodiments, ACD 130 further supplements or replaces the mandatory customer attributes or optional customer attributes during a subsequent communication with the customer, and re-calculates the first affinity score and/or the second affinity score in real-time. The "new" first affinity score and/or second affinity score is then used in steps 318 and 320 to determine the ideal agent for the customer.

In several embodiments, ACD 130 further derives additional attributes of the customer during the communication, associates the additional attributes with the mandatory customer attributes or the optional customer attributes, and stores the associated additional attributes with the mandatory customer attributes or the optional customer attributes in a database (e.g., database 152). In a subsequent communication with the customer, ACD 130 can use these associated additional attributes to route the subsequent communication to the best available agent.

A specific example of the method 300 will now be described in detail below. Table 1 below provides required or mandatory attributes and optional attributes of a customer who contacts the contact center 100.

TABLE 1

CUSTOMER ATTRIBUTES

| Mandatory Attributes | Optional Attributes |
|---|---|
| Gender: Male | Year Experience: 3 |
| Language: English | Location: U.S. |
| Technical Proficiency: 80 | |

Tables 2A-2D provide the attributes possessed by agents 1-4.

TABLE 2A

AGENT 1 AVAILABLE ATTRIBUTES

Gender: Male
Language: French
Technical Proficiency: 90
Location: U.S.

TABLE 2B

AGENT 2 AVAILABLE ATTRIBUTES

Gender: Male
Language: English
Technical Proficiency: 90
Location: U.S.

TABLE 2C

AGENT 3 AVAILABLE ATTRIBUTES

Gender: Female
Language: English
Technical Proficiency: 85
Years Experience: 15

TABLE 2C

AGENT 4 AVAILABLE ATTRIBUTES

Gender: Male
Language: English
Technical Proficiency: 95
Location: U.S.
Years Experience: 3

The mandatory attributes of the customer are intersected or matched with each of the agents 1-4, and the results are shown in Table 3 below.

TABLE 3

MATCHING MANDATORY ATTRIBUTES

| Agent | Matched Mandatory Attributes |
|---|---|
| 1 | Gender, Technical Proficiency |
| 2 | Gender, Language, Technical Proficiency |

TABLE 3-continued

MATCHING MANDATORY ATTRIBUTES

| Agent | Matched Mandatory Attributes |
|---|---|
| 3 | Language, Technical Proficiency |
| 4 | Gender, Language, Technical Proficiency |

The first affinity score is calculated for those agents possessing all of the mandatory attributes of the customer. In the present case, agents 2 and 4 both possess all of the mandatory attributes of the customer. The calculation and ranking of the first affinity score is shown below in Table 4. The gender attribute is assigned a score of 100, as this is a binary attribute that has a value of either zero (0) or a hundred (100). Technical proficiency, however, is a non-binary attribute that can have a score in a range of zero (0) to a hundred (100). Similarly, location is a non-binary attribute that can have any value (e.g., U.S., China, Sweden, Turkey, etc.). In the example above, because the locations of the customer and agent match (i.e., both U.S.), location is assigned a score of 100.

TABLE 4

MANDATORY ATTRIBUTE FIRST AFFINITY SCORE

| Agent | Calculation of First Affinity Score |
|---|---|
| 4 | Gender (100) + Language (100) + Technical Proficiency (95) = 295 |
| 2 | Gender (100) + Language (100) + Technical Proficiency (90) = 290 |

The optional attributes of the customer are intersected or matched with each of the agents 1-4, and the ranked results are shown in Table 5 below.

TABLE 5

MATCHING OPTIONAL ATTRIBUTES

| Agent | Matched Optional Attributes |
|---|---|
| 4 | Location, Years Experience |
| 1 | Location |
| 2 | Location |
| 3 | Years Experience |

The top n agents are then selected, where n is configurable. In the present case, the top 3 agents are selected, as shown in Table 6.

TABLE 6

TOP 3 AGENTS

| Agent | Matched Optional Attributes |
|---|---|
| 4 | Location, Years Experience |
| 1 | Location |
| 2 | Location |

The second affinity score is calculated for the selected 3 agents as shown below in Table 7. As discussed above, location is a non-binary attribute, which can have any value. In the present example, because the locations match (i.e., both U.S.), location is assigned a score of 100. Years experience is a non-binary attribute that can have a score in a range of zero (0) to a hundred (100). The sum of the score for the matched optional attributes is multiplied by the number of matched optional attributes.

TABLE 7

OPTIONAL ATTRIBUTE SECOND AFFINITY SCORE

| Agent | Matched Optional Attributes |
|---|---|
| 4 | 2 × [Location (100)] Years Experience (3) = 206 |
| 1 | 1 × [Location (100)] = 100 |
| 2 | 1 × [Location (100)] = 100 |

The first affinity score for the matched mandatory attributes and the second affinity score for the matched optional attributes are combined for the agents who possess all the mandatory attributes (i.e., agents 2 and 4) as shown in Table 8 below.

TABLE 8

OPTIONAL ATTRIBUTE SECOND AFFINITY SCORE

| Agent | First Affinity Score Combined with Second Affinity Score |
|---|---|
| 4 | First Affinity Score (295) + Second Affinity Score (206) = 501 |
| 2 | First Affinity Score (290) + Second Affinity Score (100) = 390 |

Based on Table 8, the "best" agent for the customer is agent 4, and ACD 130 routes the customer to agent 4.

Figure 4:
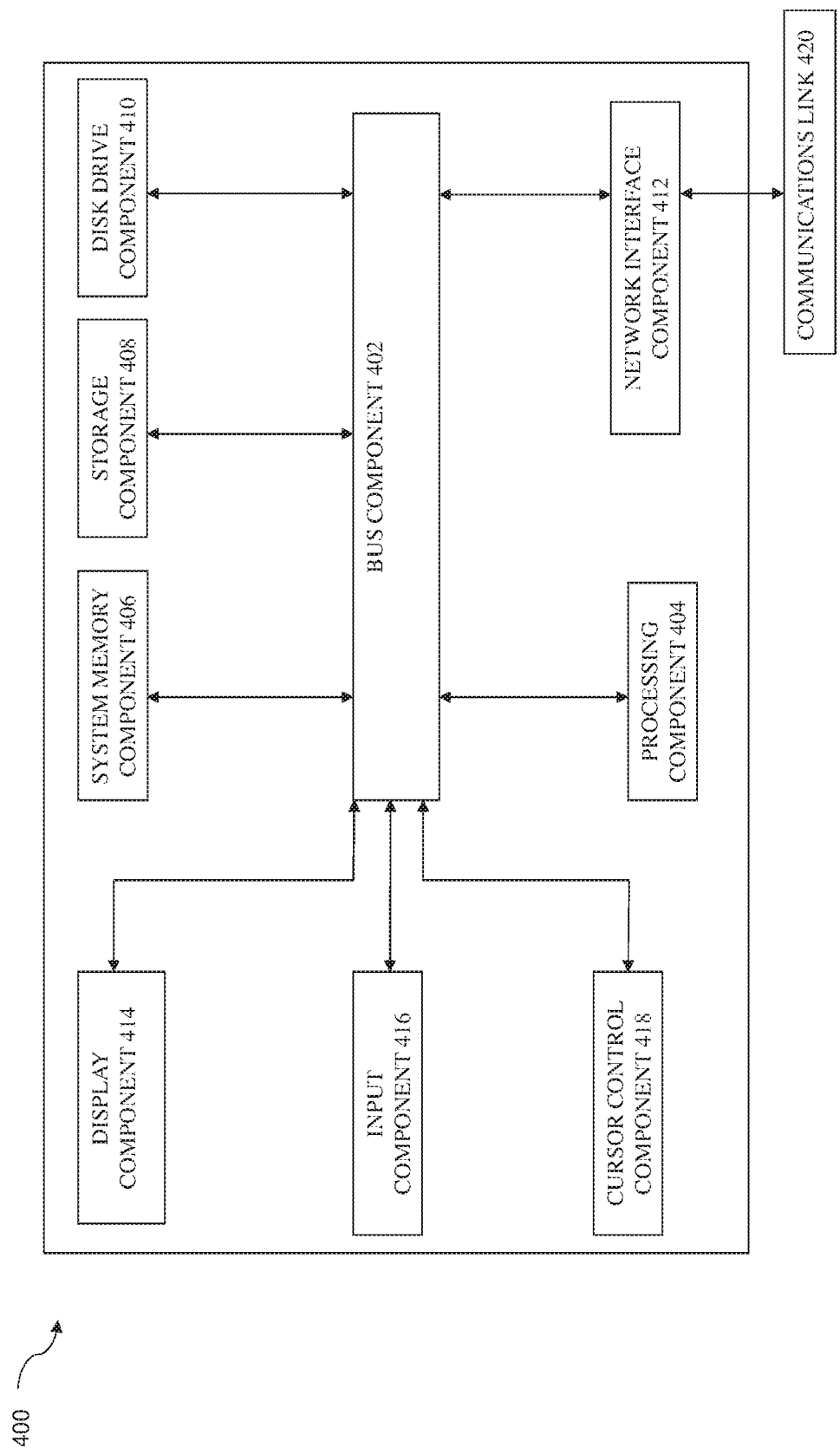
FIG. 4 is a block diagram of a computer system suitable for implementing one or more components in FIG. 1 or 2 according to one embodiment of the present disclosure.

Referring now to FIG. 4, illustrated is a block diagram of a system 400 suitable for implementing embodiments of the present disclosure, including ACD 130. System 400, such as part a computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. These may include instructions to compare customer attributes to agent attributes, calculate first and second affinity scores, and route customer communications to an available agent. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., networks 102 or 104 of FIG. 2, LAN 132, WLAN, PTSN, or various other wired or wireless networks) may perform instruction sequences to practice the disclosure in coordination with one another. Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. An automatic communication distributor (ACD) system comprising:
   a processor and a computer readable medium operably coupled thereto, the computer readable medium comprising a plurality of instructions stored in association therewith that are accessible to, and executable by, the processor, to perform operations which comprise:
   receiving a communication from a customer;
   assigning or retrieving a plurality of mandatory customer attributes and a plurality of optional customer attributes;
   matching the plurality of mandatory customer attributes and the plurality of optional customer attributes to a plurality of attributes of available agents, wherein the mandatory customer attributes and optional customer attributes each independently comprise binary attributes and non-binary attributes;
   calculating a first affinity score for each available agent that possesses attributes matching the mandatory customer attributes;
   determining for each available agent a number of attributes matching the optional customer attributes;
   ranking the available agents based on the number of matched optional customer attributes;
   selecting a predetermined number of available agents from the ranked available agents;
   calculating a second affinity score for each of the selected predetermined number of available agents;
   combining the first affinity and second affinity score for each available agent that possesses the plurality of mandatory customer attributes and is part of the selected predetermined number of available agents;
   determining which available agent has the highest combined first affinity and second affinity score; and
   routing the communication to the available agent having the highest combined first affinity and second affinity score.

2. The system of claim 1, wherein the mandatory attributes and the optional attributes of the customer are retrieved from a plurality of sources.

3. The system of claim 1, wherein the binary attributes of the customer comprise gender, and the non-binary attributes of the customer comprise language spoken, location, technical proficiency required, or years of experience.

4. The system of claim 1, wherein the operations further comprise dividing and redistributing the non-binary attributes into one or more sub-attributes.

5. The system of claim 1, wherein the available agents are ranked in a descending order of the number of optional customer attributes matched.

6. The system of claim 1, wherein calculating the second affinity score comprises:
   calculating a sum of scores for the matched optional customer attributes; and
   multiplying the sum of the scores by the number of matched optional customer attributes.

7. The system of claim 1, wherein the operations further comprise:
   supplementing or replacing the mandatory customer attributes or optional customer attributes during a subsequent communication with the customer; and
   re-calculating the first affinity score or the second affinity score in real-time.

8. The system of claim 1, wherein the operations further comprise:
   deriving additional attributes of the customer during the communication;
   associating the additional attributes with the mandatory customer attributes or the optional customer attributes;
   storing the associated additional attributes with the mandatory customer attributes or the optional customer attributes in a database.

9. A method, which comprises:
   receiving, by a processor, a communication from a customer;
   assigning or retrieving, by a processor, a plurality of mandatory customer attributes and a plurality of optional customer attributes;
   matching, by a processor, the plurality of mandatory customer attributes and the plurality of optional customer attributes to a plurality of attributes of available agents, wherein the mandatory customer attributes and optional customer attributes are each independently selected to comprise binary attributes and non-binary attributes;
   calculating, by a processor, a first affinity score for each available agent that possesses attributes matching the mandatory customer attributes;
   determining for each available agent a number of attributes matching the optional customer attributes;
   ranking the available agents based on the number of matched optional customer attributes;
   selecting a predetermined number of available agents from the ranked available agents;
   calculating, by a processor, a second affinity score for each of the selected predetermined number of available agents;
   combining the first affinity and second affinity score for each available agent that possesses the plurality of mandatory customer attributes and is part of the selected predetermined number of available agents;
   determining which available agent has the highest combined first affinity and second affinity score; and
   routing, by a processor, the communication to the available agent having the highest combined first affinity and second affinity score.

10. The method of claim 9, further comprising dividing and redistributing the non-binary attributes into one or more sub-attributes.

11. The method of claim 9, wherein calculating the second affinity score comprises:
calculating a sum of scores for the matched optional attributes of the customer; and
multiplying the sum of the scores by the number of matched optional attributes of the customer to provide the second affinity score.

12. The method of claim 9, further comprising:
supplementing or replacing the mandatory attributes or optional attributes of the customer during a subsequent communication with the customer; and
re-calculating the first affinity score or the second affinity score in real-time.

13. The method of claim 9, further comprising:
deriving additional attributes of the customer during the communication;
associating the additional attributes with the mandatory customer attributes or the optional customer attributes;
storing the associated additional attributes with the mandatory customer attributes or the optional customer attributes in a database.

14. A non-transitory computer-readable medium having stored thereon computer-readable instructions executable by a processor to perform operations which comprise:
receiving a communication from a customer;
assigning or retrieving a plurality of mandatory customer attributes and a plurality of optional customer attributes;
matching the plurality of mandatory customer attributes and the plurality of optional customer attributes to a plurality of attributes of available agents, wherein the mandatory customer attributes and optional customer attributes each independently comprise binary attributes and non-binary attributes;
calculating a first affinity score for each available agent that possesses attributes matching the mandatory customer attributes;
determining for each available agent a number of attributes matching the optional customer attributes;
ranking the available agents based on the number of matched optional customer attributes;
selecting a predetermined number of available agents from the ranked available agents;
calculating a second affinity score for each of the selected predetermined number of available agents;
combining the first affinity and second affinity score for each available agent that possesses the plurality of mandatory customer attributes and is part of the selected predetermined number of available agents;
determining which available agent has the highest combined first affinity and second affinity score; and
routing the communication to the available agent having the highest combined first affinity and second affinity score.

15. The non-transitory computer-readable medium of claim 14, wherein the operations further comprise dividing and redistributing the non-binary attributes into one or more sub-attributes.

16. The non-transitory computer-readable medium of claim 14, wherein the calculating the second affinity score comprises:
calculating a sum of scores for the matched optional attributes of the customer; and
multiplying the sum of the scores by the number of matched optional attributes of the customer to provide the second affinity score.

17. The non-transitory computer-readable medium of claim 14, wherein the operations further comprise:
supplementing or replacing the mandatory attributes or optional attributes of the customer during a subsequent communication with the customer; and
re-calculating the first affinity score or the second affinity score in real-time.

* * * * *